United States Patent [19]
Witte

[11] Patent Number: 5,093,887
[45] Date of Patent: Mar. 3, 1992

[54] SLIDING CABLE TRAY WITH CABLE PIVOT ARM

[75] Inventor: Thomas M. Witte, Hoffman Estates, Ill.

[73] Assignee: Reliance Comm/Tec Corporation, Chicago, Ill.

[21] Appl. No.: 590,669

[22] Filed: Sep. 28, 1990

[51] Int. Cl.⁵ .............................................. G02B 6/36
[52] U.S. Cl. ................................... 385/135; 385/134; 248/51
[58] Field of Search ........................ 248/51, 68, 1, 69; 350/96.2, 96.21

[56] References Cited

U.S. PATENT DOCUMENTS

| | | | |
|---|---|---|---|
| 2,695,762 | 11/1954 | Wersching | 248/51 |
| 3,717,319 | 2/1973 | Schultz et al. | 248/51 |
| 4,824,196 | 4/1989 | Bylander | 350/96.20 |
| 4,861,134 | 8/1989 | Alameel et al. | 350/96.2 |
| 4,898,448 | 2/1990 | Cooper | 350/96.2 |
| 4,971,421 | 11/1990 | Ori | 350/96.20 |

Primary Examiner—John D. Lee
Assistant Examiner—Stephen W. Barns
Attorney, Agent, or Firm—Trexler, Bushnell, Giangiorgi & Blackstone, Ltd.

[57] ABSTRACT

A pivot arm and a sliding shelf assembly for use in a cabinet housing and efficiently organizing fiber optic cables. The shelf assembly including a shelf movable into and out of the cabinet providing an area for storing a length of fiber optic cable and upon which cables may be joined. The pivot arm movably supports at least one cable routed to the shelf assembly and includes a radius maintaining support member for maintaining at least a predetermined radius in said cable when said shelf is moved into and out of the cabinet.

15 Claims, 3 Drawing Sheets

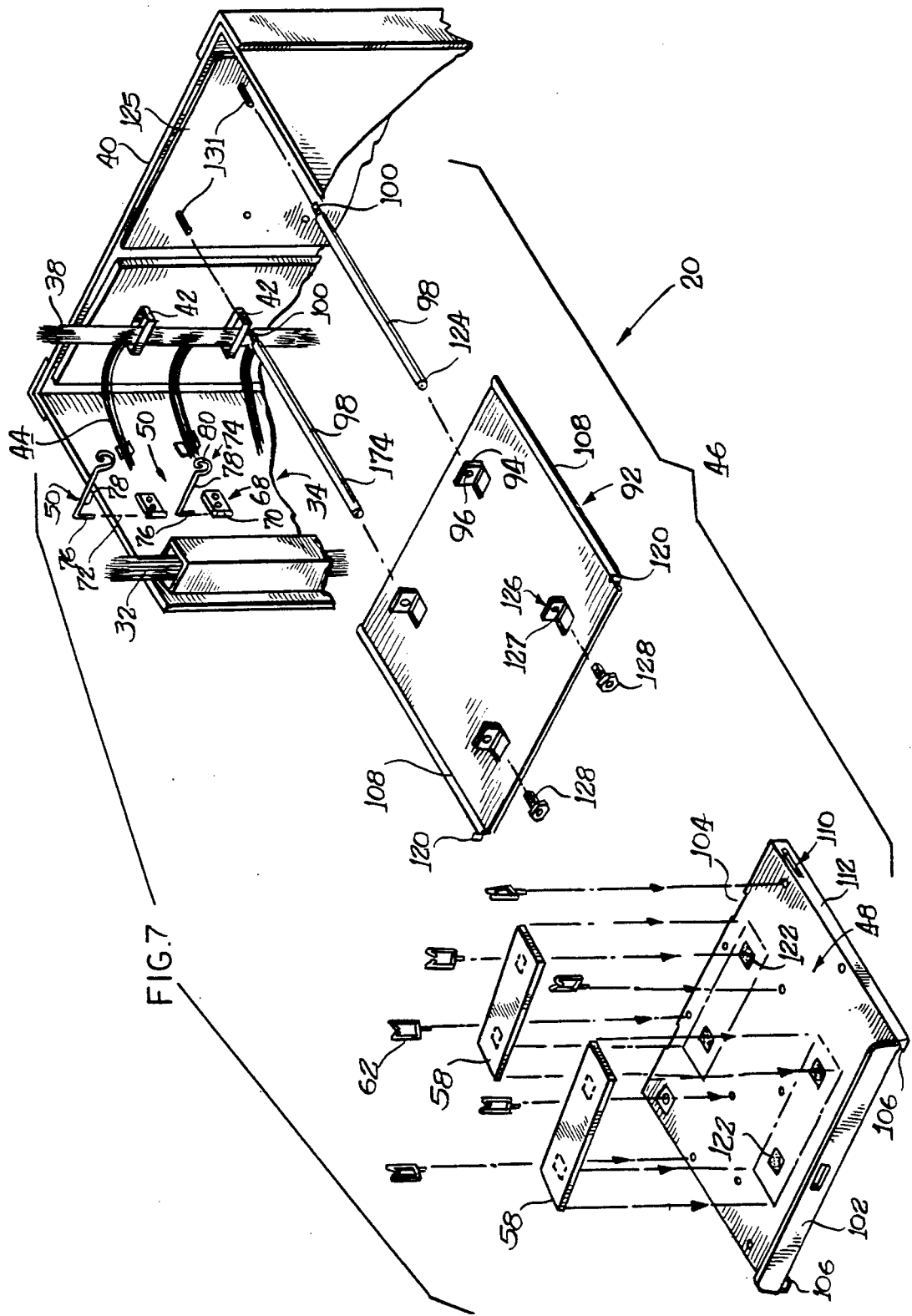

SLIDING CABLE TRAY WITH CABLE PIVOT ARM

BACKGROUND OF THE INVENTION

This invention relates to the cable management art and more particularly to a fiber optic splice cabinet which accommodates one or more relatively movable shelves accommodating splicing trays and prevents undesirable bending of the fiber cables when the shelves are moved relative to the cabinet.

In the telecommunications field, it is necessary to house and organize transmission cable connections in an efficient manner. Failure to efficiently manage fiber optic cable routing and splicing may result in excessive installation time and/or repair time and unnecessary additional system down time during repairs.

Of additional importance is the handling of fiber optic cable in an efficiently organized housing. Fiber optic cable is formed of glass fibers which transmit data in the form of light through the phenomena of internal reflection. In order for a fiber optic cable to efficiently transmit data, certain physical limitations are imposed on the cable material. Foremost, fiber optic cable has a limited range of bending and must be maintained above a minimum radius. If the radius is below the minimum required radius for the particular type of fiber optic cable it will impair transmission through the cable or even cause the cable to kink or snap, with attendant transmission loss.

Some prior art fiber cable management devices have attempted to overcome the physical limitations imposed on the housing and organization of fiber optic cables. For example, in one form of fiber cable management device fiber optic cables are securely tied, using cable ties, to discrete points throughout the cabinet. While such an arrangement may be designed to maintain the fiber optic cables above a minimum predetermined radius, it is difficult to successfully implement and maintain. For example, such an arrangement requires that when cables are to be removed or rerouted each connecting point must be opened and reattached to retain the remaining fiber optic cables.

Moreover, such an arrangement may be organized with branches which are routed to a rack portion or tray for splicing with other cables. The splicing area may be arranged to organize the cables using the least amount of space, thereby requiring the tray to be removed from the cabinet for installation, servicing or alteration of splices, and thereafter reinserted. When the tray is removed from or reinserted into the cabinet the cables, which are attached to the inside of the cabinet at discrete locations, may not provide sufficient play to maintain the minimum required radius. However, when additional slack is provided, the cables may tend to snag and obstruct access to and organization within the cabinet.

The splice device is typically arranged on some form of sliding shelf which may be extracted from or returned to the cabinet in a sliding manner. Slide rails may be employed to provide a friction reducing sliding support for the cable shelf. The slide rails are mounted to inside surfaces of the cabinet in which the shelves are positioned to provide sufficient support for the multiple cables and splicing device retained on the shelf. The slide rails can interfere with the cables which branch from a main cable group.

Objects and Summary of the Invention

A general object of the present invention is to provide a fiber optic splice or splicing cabinet for organizing and housing fiber optic cables which maintains a minimum required radius on the fiber optic cables.

Another object of the present invention is to provide a splice cabinet for fiber optic cables which is arranged with a plurality of shelves which slide in and out of the cabinet.

Briefly, in accordance with the foregoing, the present invention comprises a pivot arm and a sliding shelf assembly for use in a cabinet for housing and efficiently organizing fiber optic cables. The shelf assembly includes a sliding shelf containing and splice trays movable into and out of the cabinet providing an area for storing a length of fiber optic cable and upon which cables may be joined. The pivot arm movably supports at least one fiber cable routed to the shelf assembly and includes a radius maintaining support member for maintaining at least a predetermined radius in said cable when the shelf is moved into and out of the cabinet.

BRIEF DESCRIPTION OF THE DRAWINGS

The features of the present invention which are believed to be novel are set forth in the appended claims. The organization and manner of operation of the invention, together with further objects and advantages thereof, may best be understood by reference to the following description taken in connection with the accompanying drawings wherein like reference numerals identify like elements and in which:

FIG. 7 is an exploded partial perspective view of the fiber optic cable splice or connection cabinet of the invention.

DETAILED DESCRIPTION OF THE ILLUSTRATED EMBODIMENT

Figure 1:
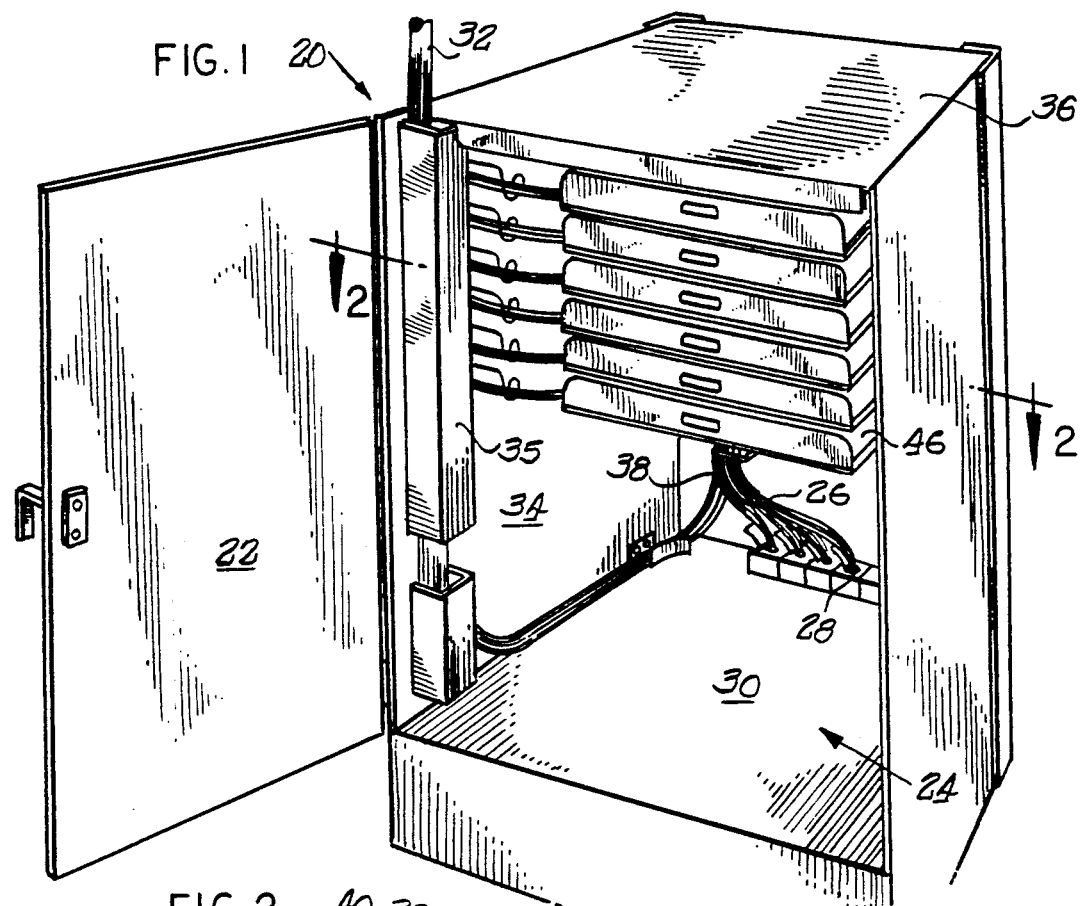
FIG. 1 is a partial perspective view of a fiber optic splice or connection cabinet of the present invention in which a front panel is opened to display the contents of the cabinet.

While this invention may be susceptible to embodiment in different forms, a preferred embodiment of the present invention is shown in the drawings and will be described herein in detail, with the understanding that the present disclosure is to be considered an exemplification of the principles of the invention, and is not intended to limit the invention to the embodiment illustrated and described herein.

Figure 2:
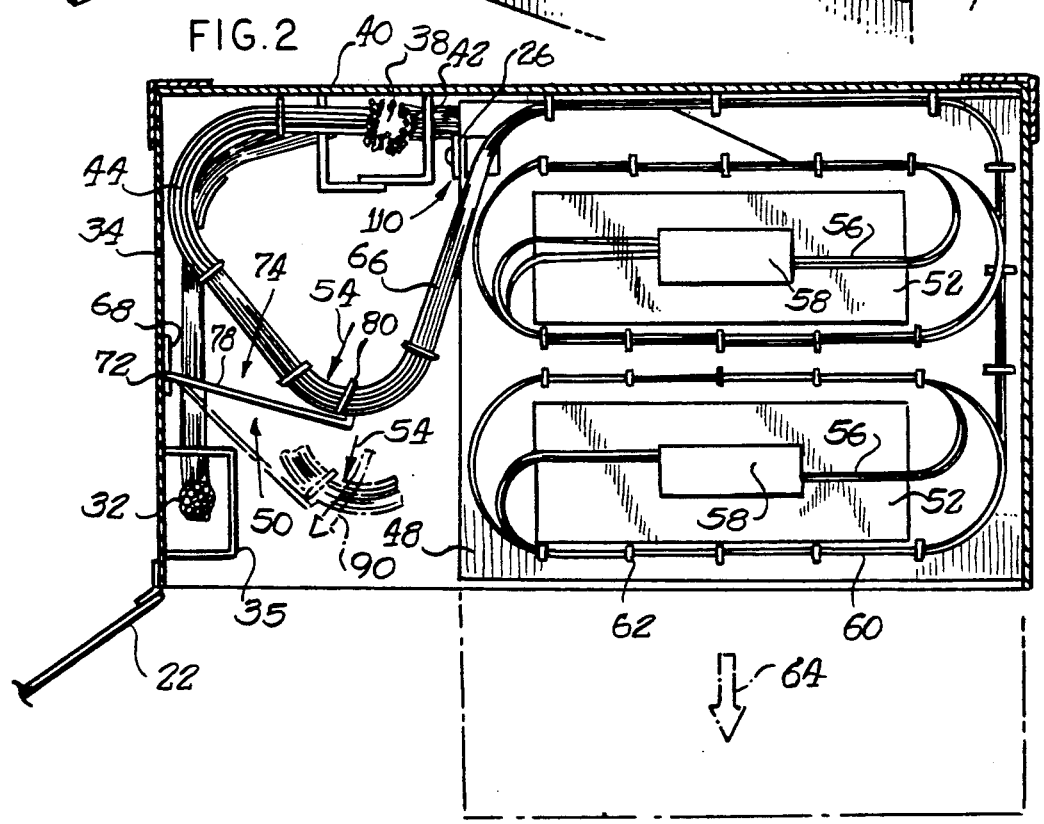
FIG. 2 is a partial sectional view taken along line 2—2 in FIG. 1.

Referring now to the drawings wherein like parts are designated by the same reference numerals throughout the figures, a fiber optic cable connection cabinet 20 is shown in FIG. 1 having a front panel 22 thereof opened to reveal the internal contents. An internal compartment 24 is efficiently organized for internal cable management. Cable management, as illustrated in FIG. 1, is accomplished by routing entering cables 26 in through entry ports 28 formed adjacent a bottom panel 30 and a back panel 40 (see FIG. 2) of the internal compartment 24. Exiting cables 32 extend through a trough or channel 35 which is mounted just behind door 22 on a side 34 of the cabinet 20 and upwardly through a top panel 36. With reference to FIG. 2, the entering and exiting cables 26, 32 combine in a combined cable bundle 38 which generally extends up the back panel 40 and is retained in position by cable retaining clips 42 at selected intervals. Splice branches 44 are routed from the combined cable bundle 38 and to a cable shelf assembly 46 (see FIG. 1).

FIG. 2 shows a general layout for the cable shelf assembly 46 in somewhat diagrammatic form. A similar assembly is used for each of the plurality of cable shelf assemblies 46 and accompanying splice branches 44. At each cable shelf assembly 46 the splice branch 44 carries selected ones of both entering and exiting cables 26, 32 to a shelf 48. The selected entering and exiting cables 26, 32 are routed along the splice branch 44 to a radius maintaining support means 50 and then to the shelf 48 where predetermined ones of the selected exiting and entering cables 26, 32 are allocated to at least one (or, as illustrated two) splice trays 52. It should be noted that the cables as shown in the illustrated embodiment are fiber optic cables, and therefore a minimum radius must be maintained in the cables at all times to prevent impairment of transmission through the cables as well as kinking or snapping of the cables with attendent transmission loss. Radius maintaining support means 50, as will be more fully described later, maintains at least this minimum radius, as indicated by reference numeral 54.

Each of the entering and exiting cables 26, 32 is composed of numerous individual fibers from which a portion of the protective jacket is removed to permit individual manipulation and joining with a corresponding fiber from the other cable. The individual fibers 56 are joined with corresponding fibers, and the joined portions are retained, in a splice tray 58. The splice tray 58 assures that the joined individual fibers 56 do not become disconnected. Joining of the individual fibers 56 can be accomplished by either direct weld or fusion joining or by connectorized joining whereby a connector is attached to the end of each fiber 56 and mechanically interconnected in a desired arrangement. Surplus cable 60 is coiled around cable retainers 62 which retains the length of surplus cable 60 in an orderly fashion.

As shown in FIG. 1, the cable shelf assemblies are normally retracted into the cabinet 20 to prevent interference with the cables retained therein. When cables in a splice tray 58 are to be operated upon, the shelf 48 of the corresponding cable shelf assembly 46 is removed from the cabinet as indicated by arrow 64 in FIG. 2. When the shelf 48 is withdrawn from the cabinet 20 a leading portion 66 of the splice branch 44 extending beyond the radius maintaining support means 50 moves with the movement of the shelf 48. As the leading portion 66 moves, the radius maintaining support means 50 is moved thereby maintaining at least the minimum radius 54 of the cables comprising the splice branch 44.

Figure 4:
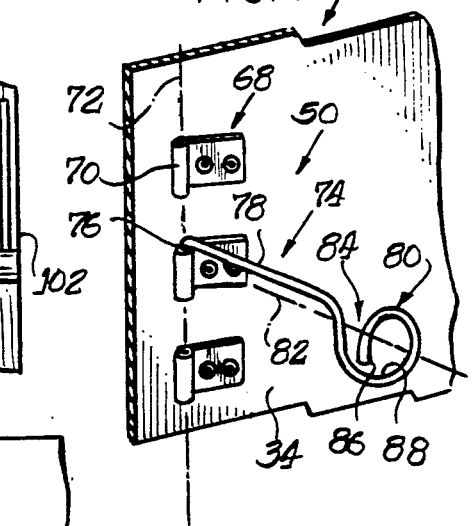
FIG. 4 is an enlarged view of the radius maintaining support means showing a pivot bracket mounted to an inside surface of the cabinet and a pivot arm pivotally retained therein.

The radius maintaining support means 50 (see FIG. 4) comprises a pivot bracket 68 which is attached to the side 34 of the cabinet 20 and mounts a pivot arm 74. The pivot bracket 68 is provided with a cylindrical support portion 70 defining a pivot axis 72 extending longitudinally therethrough. The pivot arm 74 is generally integrally formed of a single piece of material. A pivot pin portion 76 (shown in FIG. 7) is formed on one end of an elongated portion 78 and is pivotably engageable with the cylindrical portion 70 of the pivot bracket 68. A retaining portion 80 is formed on an end of the elongated portion 78 of the pivot arm 74 distal the pivot pin portion 76. The retaining portion 80 is generally formed as a helical coil completing at least a full revolution about a longitudinal axis 82 generally parallel to the elongated portion 78.

Figure 3:
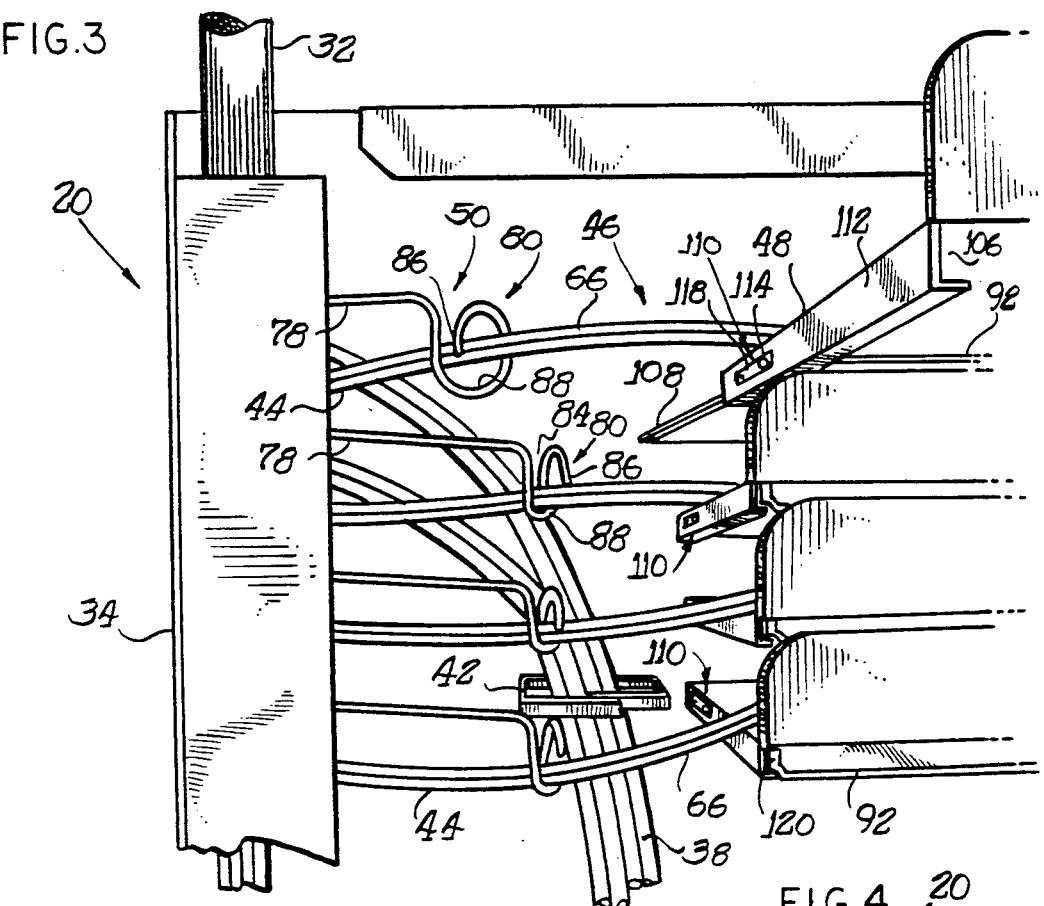
FIG. 3 is an enlarged partial view of the cabinet of FIG. 1 in which radius maintaining support means support cables extending to a cable shelf assembly.

FIG. 3 provides a further view of the elongated portion 78 and retaining portion 80 of the radius maintaining support means 50 associated with several of the shelves 48. As shown in FIG. 3, the splice branch 44 supported by each radius maintaining support means 50 is insertable into the helical coil of the retaining portion 80 past a gap 84 between the elongated portion 78 and an end 86. Splice branch 44 cables inserted into the retaining portion 80 generally lie in a bottom arc 88 of the retaining portion 80. With reference to FIGS. 2 and 3, when the shelf 48 is extracted from the cabinet 20, the splice branch 44 cables retained by the radius maintaining support means 50 (shown in the top of the illustration of FIG. 3) flexibly, slightly and pivotally move the pivot arm in an arc 90 centered on the pivot axis 72. When the shelf 48 is moved 64 out of the cabinet 20, the lead portion 66 of the splice branch 44 transfers forces from the movement of the shelf 48 to the pivot arm 74 to induce pivotal movement through the arc 90. Movement of the splice branch 44 supported by the pivot arm 74 maintains at least the minimum radius 54 in the cables of the splice branch 44.

Figure 5:
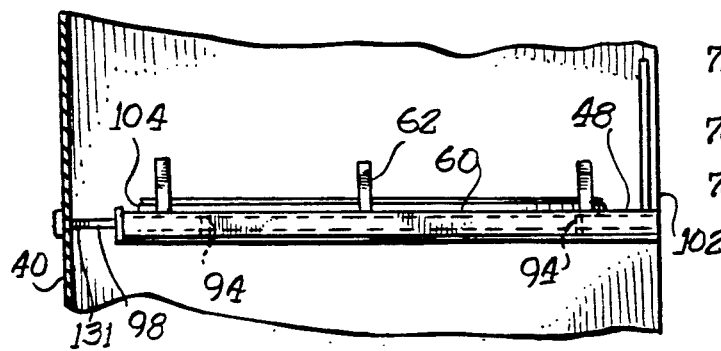
FIG. 5 is a partial sectional side view of a cable shelf assembly retained within the fiber optic cable splice or connecting cabinet.

Turning now to FIG. 7, a portion of the side 34 and back panel 40 are illustrated. The cable shelf assembly 46 which is attachable to the back panel 125 is exploded therefrom for purposes of discussion. Further detail is provided by reference to FIGS. 1-3 and 5, 6. A platform portion 92 is formed with engaging tabs 94 and 126 having apertures 96 and 127 formed therethrough for receiving and running up against an elongated rod or rod-like member 98. The back panel 125 has threaded studs 131 protruding perpendicular from the back panel. Each elongated rod-like member 98 is threadedly attached to the back panel studs 131 by fastener 100, here shown as an internal or female threaded end portion 124 of each rod 98. As shown in FIGS. 5 and 7, the rod member 98 extends generally perpendicularly away from the back panel 125 through tabs 94 formed toward the rear of the platform 92 and rests against the front tabs 126. The platform 92 is then locked into position using fasteners 128 which penetrate through aperture 127 and is threaded into the female threaded portion of the rod like member 98. Formed and attached as such, the platform portion 92, provides a stable base for supporting the shelf 48 while permitting access from three sides.

Figure 6:
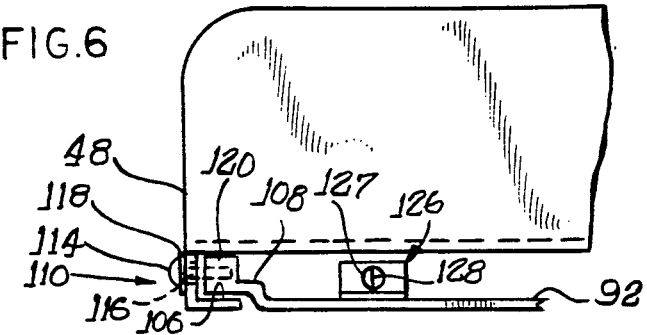
FIG. 6 is an enlarged partial front view of the cable shelf assembly illustrating interengagement of a cable tray on a platform member.

With reference to FIGS. 3, 6 and 7 the shelf 48 slidably moves on top of the platform portion 92. As shown in the enlarged detailed view of FIG. 6, corresponding outside edges of the shelf 48 and the platform portion 92 are cooperatively formed to permit slidable engagement of the shelf 48 on the platform portion 92. Channels 106 formed on the outside edges of the shelf 48 and cooperative lips 108 are formed on corresponding sides of the platform portion 92. The channels 106 open towards each other for engagement with the lips 108.

When not in use the weight of the cables retained on the shelf 48 and of the shelf 48 itself is supported by the platform portion 92 connected to the back panel 125 by the rod-like members 98. When the shelf 48 is extracted from the cabinet 20 the channels 106 retainably guide movement of the shelf 48 along the lips 108. Shelf extension is limited by releaseable locking means 110 attached to outside surfaces 112 of the channels 106. Each locking means 110 comprises a protuberant member 114 which movably projects through an aperture 116 formed through the side surface 112 of the respective channel 106. The protuberant member 114 is attached to a biasing member such as a leaf spring 118 which is securely attached to the side surface 112. The biasing member 118 retains the protuberant member 114 in engagement with the aperture 116 formed through the side 112 of the channel 106. Upon withdrawal of the shelf 48 from the cabinet 20 the protuberant member 114 contacts a protuberance stop member 120 formed on at least one portion along the lip 108 of the platform portion 92. The shelf 48 may be moved beyond the stop position, defined by the protuberance stop member 120 and the protuberant member 114 by flexing the biasing means 118 to remove the protuberant member 114 from the aperture 116 sufficiently to disengage it from contact with the protuberance stop member 120.

The shelf 48 is easily removable from the cabinet and disengageable from the platform portion 92 when operations must be executed thereupon. For example, operations to be carried out upon the contents of the shelf 48 include repair of fiber cables 60 (see FIG. 2), operations on the individual fibers 56 connected in the splice trays 58, and additions or deletions of cables to the shelf 48. The shelf 48 and its contents may be easily removed from the platform portion 92 by extracting it from the cabinet 20 and disengaging the locking means 110 to overcome the stop members 120.

The splice trays 58 are similarly easy to remove from the shelf 48 since they are preferably attached thereto by contact engagement devices 122 (see FIG. 7) such as Velcro. Efficient organization of the shelf 48 and splice trays 58 and easy removal of these elements from the cabinet 20 provide efficient access to and operation upon the telecommunications equipment and cables retained in the cabinet 20. Furthermore, the generally planar orientation of each of the cable shelf assemblies 46 maximizes the space in the internal compartment 24 and relies upon gravity as well as cable retainers 62 to maintain the cables in an organized fashion.

While a particular embodiment of the present invention has been shown and described in detail herein, it may be obvious to those skilled in the art that changes and modifications of the present invention, in its various aspects, may be made without departing from the invention in its broader aspects, some of which changes and modifications being matter of routine engineering or design and others being apparent after study. As such, the scope of the invention should not be limited by the particular embodiment and specific construction described herein. Rather, the scope of the invention should be defined in the appended claims and equivalents thereof. Accordingly, the aim of the appended claims is to cover all such changes and modifications as fall within the true spirit and scope of the invention.

I claim:

1. A fiber optic cable connection cabinet having internal cable management for accommodating cables entering and connected therein, and cables exiting therefrom, said cabinet comprising: at least one cable shelf assembly including a cable shelf movable into and out of said cabinet, said cable shelf providing an area for storing a length of fiber optic cable and an area for joint cables thereon; radius maintaining support means for movably supporting at least one cable routed to said shelf of said at least one cable shelf assembly, said radius maintaining support means maintaining at least a predetermined radius in said cable when said shelf is moved into and out of said cabinet; said radius maintaining support means comprising an elongated rod-like pivot arm.

2. A fiber optic connection cabinet according to claim 1, wherein said cabinet is dimensioned for housing a plurality of said cable shelf assemblies each for accommodating a plurality of cable joints.

3. A fiber optic connection cabinet according to claim 1, wherein said cable shelf assembly includes a shelf support assembly mounted to an inside surface of said cabinet and wherein said shelf is operatively engaged with said shelf support assembly for moving said shelf into and removing said shelf from said cabinet.

4. A fiber optic connection cabinet according to claim 3, wherein said shelf is accessible from three access sides when said shelf is withdrawn from said cabinet.

5. A fiber optic cable connection cabinet according to claim 3, wherein said shelf support assembly includes at least one rod-like member projecting from an inside surface of said cabinet and a platform portion supported on said rod for receiving said shelf.

6. A fiber optic cable connection cabinet according to claim 5, wherein said cable shelf assembly includes locking means for retaining said shelf in at least one predetermined position along said shelf support.

7. A fiber optic cable connection cabinet according to claim 6, wherein said locking means comprises: a biased locking protuberance attached to said shelf, said biased locking protuberance including a protuberant member retained on a biasing member attached to said shelf and a protuberance stop member on said platform portion; an aperture formed through said shelf through which protuberant member projects and operatively engages said protuberance stop member; said protuberant member being disengageable from said protuberance stop member to permit movement of said shelf beyond said stop member relative to said platform portion.

8. A fiber optic cable connection cabinet according to claim 3, wherein corresponding sides of said platform portion of said shelf support assembly and said shelf are cooperatively formed for facilitating sliding engagement of said shelf on said platform portion, such that said shelf slides into and out of said cabinet along said cooperatively formed corresponding sides.

9. A fiber optic cable connection cabinet according to claim 1, wherein said radius maintaining support means further includes a pivot bracket formed for retaining said pivot arm therein, said pivot bracket being mounted to an inside surface of said cabinet, said pivot arm being pivotally engaged in said pivot bracket for pivoting said pivot arm in an arc generally parallel to a plane in which said cable shelf assembly is located, such that said pivot arm maintains at least said predetermined radius in said cables when said shelf to which said cables are routed is moved into and out of said cabinet.

10. A fiber optic cable connection cabinet according to claim 9, wherein said pivot arm includes a pivot pin portion, a generally horizontally extending elongated portion and a cable retaining portion; said pivot pin portion being integrally formed with and extending perpendicularly from said elongated portion and said cable retaining portion being integrally formed on an end of said elongated portion distal said pivot pin portion; said pivot pin portion being operatively positioned in said pivot bracket and pivotally movable therein; and said cable retaining portion supporting at least one cable therein for maintaining at least said predetermined radius in said cable in response to movement of said shelf to which said cable is routed.

11. A pivot arm assembly for routing cable in a cable connection cabinet having at least one movable cable shelf assembly; said pivot arm assembly including a pivot arm member and a pivot bracket, said pivot arm assembly providing a minimum radius retaining support for cables associated therewith; said pivot bracket being attachable to a n inside surface of said cabinet for pivotally supporting said pivot arm member; said pivot arm member comprising an elongated rod-like member and being pivotably engageable with said pivot bracket, said pivot arm member supporting at least one cable routed to said movable cable shelf assembly said pivot arm member supporting said cable and maintaining at least a desired radius therein when said cable shelf assembly to which said cable is routed is moved relative to said cabinet.

12. A pivot arm assembly according to claim 11, wherein said pivot arm further includes a pivot pin portion, an elongated portion and a cable retaining portion formed on an end of said pivot arm member; said pivot pin portion being integrally formed with and extending perpendicularly from said elongated portion and said cable retaining portion integrally formed on an end of said elongated portion distal said pivot pin portion; said pivot pin portion being operatively positioned in said pivot bracket and pivotally movable therein; and said cable retaining portion supporting said at least one cable therein for maintaining at least said desired radius in said cable in response to movement of said shelf to which said cable is routed.

13. A pivot arm according to claim 12 further including a helical coil formed on an end of said pivot arm distal said pivot bracket, an axis of said helical coil being generally parallel to a longitudinal axis of said elongated portion; such that a cable is guided generally extending parallel to said longitudinal axis through said helical coil and is supported in a generally horizontal plane thereby.

14. A pivot arm for generally horizontally supporting at least one cable in a pivotal relation to a movable member to which said cable is routed and maintaining at least a predetermined minimum radius in said cable, said pivot arm being operatively engageable with a retaining means for pivotably retaining said pivot arm, said pivot arm comprising: a single pivot pin portion, a generally horizontally extending elongated portion, and a cable guiding portion; said pivot pin portion being formed with and extending downwardly from said elongated portion and operatively engageable with said retaining means and pivotally movable therein; said cable guiding portion being formed on an end of said elongated portion distal said pivot pin portion; and said elongated portion supporting said cable guiding portion by which said at least one cable is supported for maintaining at least a desired radius in said cable in response to movement of said movable member to which said at least one cable is routed.

15. A pivot arm according to claim 14, wherein said cable guiding portion is formed in a helical coil, an axis of said helical coil being generally parallel to a longitudinal axis of said elongated portion such that a cable is guided extending generally parallel to said longitudinal axis through said helical coil and supported in a generally horizontal plane thereby.

* * * * *